United States Patent [19]

Allina

[11] Patent Number: 5,130,884
[45] Date of Patent: * Jul. 14, 1992

[54] PARALLEL ELECTRICAL SURGE-PROTECTIVE VARISTORS

[76] Inventor: Edward F. Allina, 305 Capri Blvd., Treasure Island, Fla. 33103

[*] Notice: The portion of the term of this patent subsequent to Feb. 13, 2007 has been disclaimed.

[21] Appl. No.: 478,660

[22] Filed: Feb. 12, 1990

Related U.S. Application Data

[63] Continuation-in-part of Ser. No. 923,524, Oct. 28, 1986, Pat. No. 4,931,895, and a continuation-in-part of Ser. No. 123,419, Jan. 12, 1989, Pat. No. 4,901,187.

[51] Int. Cl.⁵ ............................................. H02H 9/04
[52] U.S. Cl. ................................... 361/117; 361/127; 361/56; 338/21

[58] Field of Search ............... 361/117, 126, 127, 366, 361/376, 56; 338/21

[56] References Cited

U.S. PATENT DOCUMENTS 4,901,187  2/1990  Allina ................................. 361/117

*Primary Examiner*—Todd E. DeBoer
*Attorney, Agent, or Firm*—Charles A. McClure

[57] ABSTRACT

Surge-protective varistors connected to shunt transient surges in electrical power lines to ground before damage to watt-hour meters or downstream loads. Conductive laminar members provide compact parallel circuit interconnection of varistors to increase the current-carrying capacity of protective apparatus containing them.

15 Claims, 3 Drawing Sheets

PARALLEL ELECTRICAL SURGE-PROTECTIVE VARISTORS

This is a continuation-in-part of my copending application Ser. No. 923,524, filed Oct. 28, 1986, issued as U.S. Pat. No. 4,931,895; and of my copending application, Ser. No. 123,419, filed Jan. 12, 1988, issued as U.S. Pat. No. 4,901,187. Those prior applications are incorporated herein by this reference.

FIELD OF THE INVENTION

This invention relates to protection of electrical equipment from transient surges in voltage, as from an external power source, especially by means of varistors connected in parallel in protective apparatus between such power source and electrical loads downstream.

BACKGROUND OF THE INVENTION

The desirability of protecting electrical meters and related equipment from voltage surges is well known. Similarly known are devices whose resistance varies non-linearly under applied voltage so that conduction therethrough is disproportionately greater at higher voltages than at normal lower voltages. The name "varistor" is commonly and suggestively applied to a class of such devices.

Varistors connected to provide such surge protection have been installed within meters, as in Melanson U.S. Pat. No. 3,914,657 and in Zisa U.S. Pat. No. 3,725,745; and also in devices of plug-and-jack type adapted for use between electrical outlets and appliances to be operated by electricity drawn from such outlets, as in Orfano U.S. Pat. No. 4,089,032. Plug-and-jack devices for use between such an electric meter and the premises of an electricity customer include circuit-interrupting means (switches, with or without associated fuses), as suggested by Megarian in U.S. Pat. No. 3,599,047 and by St. John in U.S. Pat. No. 2,606,232. Interposition of a varistor or similar non-linear resistor between such a meter and downstream equipment at a customer's location is less apparent, notwithstanding that a need exists for a simple effective way to provide surge protection.

SUMMARY OF THE INVENTION

In general, the objects of the present invention are attained by shunting transient surges in electrical power to ground before watt-hour meters and downstream loads are affected thereby. More particularly, this invention provides compact interconnection of varistors in parallel circuit to increase the current-carrying capacity of protective apparatus containing them. Protection is optimized by utilizing such parallel varistors in conductive relationship with a ground plane heat sink to dissipate imposed excess energy loads, such as from frequent and/or severe lightning strikes, resulting transformer saturation, or distribution faults.

A primary object of the present invention is to enable meters of conventional electromechanical or all electronic watt-hour type to be protected from transient surge damage without modification of such a meter or of its conventional socket at a customer's location.

Another object of this invention is to utilize varistors or similar devices, in coping with transient surges, from single-phase or multi-phase power sources, not only to protect such meters but also to protect power customers' electrical equipment downstream.

A further object is to combine multiple varistors in parallel so as to increase current-carrying capacity in a confined space such as a plug-in (or other) meter housing, an electrical panel including a socket for a plug-in meter, or between the meter housing and the socket, with or without a surrounding housing as a meter adapter.

Other objects of the present invention, together with means and methods for attaining the various objects, will be apparent from the following description and the accompanying diagrams of specific embodiments, being presented by way of example rather than limitation.

DETAILED DESCRIPTION

Figure 1A:
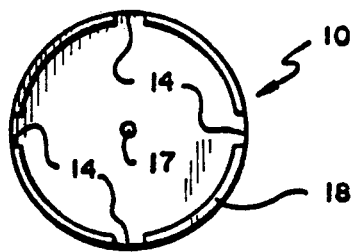
FIGS. 1A and 1B are respective front and side elevations of a device for holding a plurality of varistors in stacked arrangement according to this invention.
Figure 1B:
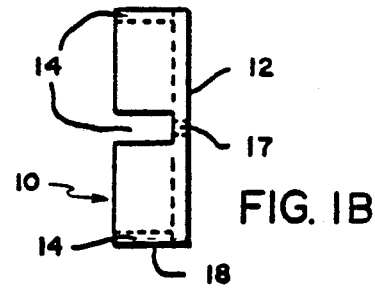

FIGS. 1A and 1B show modified cuplike holder 10 from the front and side, respectively. Sidewall 18 has four like slots 14 formed at 20° intervals therethrough from its free edge to but not into base 12. Central bore 11 is adapted to admit a lead from a power source. The purpose of slotting the sidewall will become apparent from succeeding views.

Figure 2A:
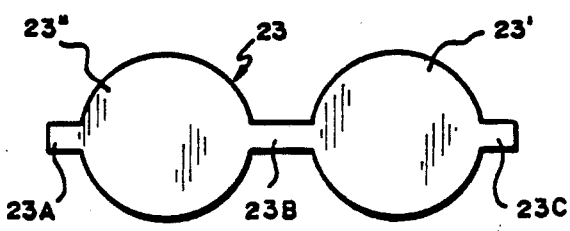
FIGS. 2A and 2B are flat or plan views of a pair of laminar members useful in interconnecting varistors in parallel circuit, as in the holder device of the preceding views.
Figure 2B:
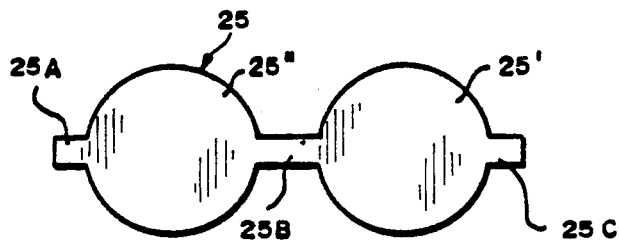

FIGS. 2A and 2B are flat views of pair of spectacle-shaped (identical) laminar electrical conductors 23 and 27 useful in the embodiment of FIG. 10. Thus, conductor 23 has two round disklike parts 23' and 23" interconnected by narrow bight 23B and flanked by tabs 23A and 23C extending to the left and right, respectively. Likewise, conductor 27 has round parts 27' and 27" connected by bight 27B and flanked by tabs 27A and 27C at the left and right.

Figure 3A:
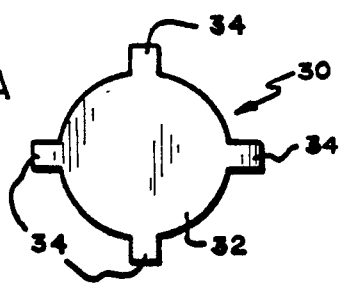
FIG. 3A is a flat view of a non-conductive auxiliary laminar member for use with varistors connected in such a holder device.
Figure 3B:
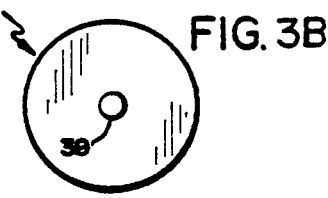
FIG. 3B is a flat view of a conductive auxiliary laminar member for use with varistors connected in such a holder device.

FIGS. 3A and 3B are flat views of dissimilar laminar parts of such modified apparatus embodiment. FIG. 3A shows insulating disk 30 having four tabs 34 extending from circular body part 3 at quadrantal intervals, each much like the tabs of the conductors of the laminar members in the preceding pair of views. FIG. 3B shows round conductive disk 38 with protruding central connector 39.

Figure 4:
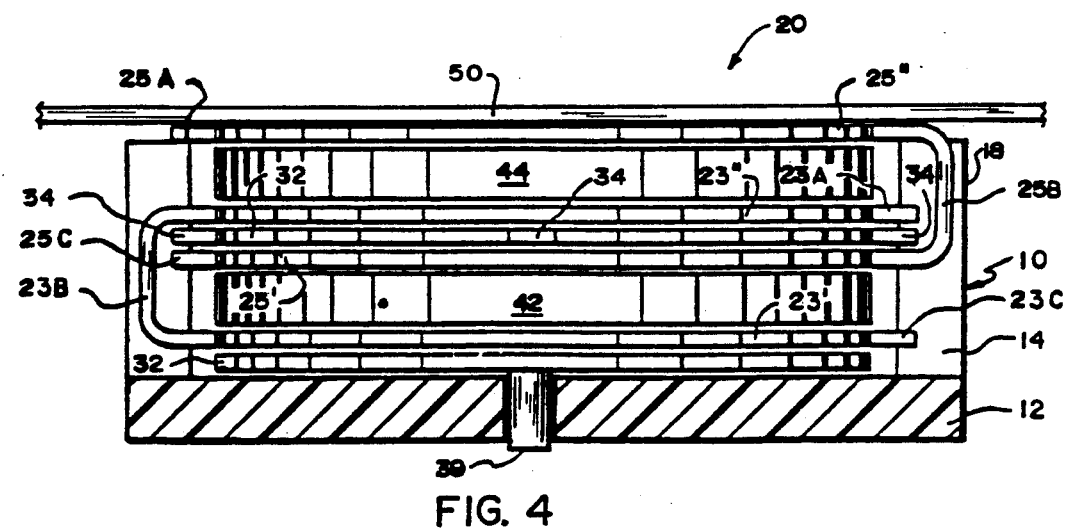
FIG. 4 is a sectional elevation through one such holder device with a pair of varistors and such laminar members assembled therein, together with auxiliary conductive and non-conductive members.

FIG. 4 shows the parts of the embodiment of the preceding views assembled as varistor means 20 with holder device 10 sectioned for clarity of illustration. The view is turned 90° from FIG. 1B to fit in the allotted space. It will be understood that adjacent faces are in actual contact although shown spaced here for convenience. Cuplike holder 10 is sectioned diametrally (the circular members are shown circumferentially as preferable to sectional shading) and has sidewall 18 upstanding from its base 12 with slots 14 at the left and right. Resting against the inside surface of base 12 is conductive disk 38—with its central connector 39 protruding in position to be contacted by a hot lead from a power line.

Two varistors 42 and 44, each with an insulating collar (not distinguished here), overlie holder base 12 but without contacting it directly. Formerly spectacle-shaped lamina 23' now with bight 23B bent through 180°, has its lower disklike part 23, located between the upper face of conductive disk 38 and the hot (lower, in this view) face of varistor 42 and has its upper disklike part 23" between the corresponding (lower) face of varistor 44 and the upper face of insulating disk 32 (with tabs 34) between the respective varistors—though not in contact with either. Similarly, lamina 27 (formerly spectacle-shaped), now with bight 27B bent C-shaped, has its lower disklike part 27, between the upper face of varistor 42 and the lower face of insulating disk 34 and has its upper disklike part 27" overlying the upper face of varistor 44 at the open end of the holder and in conductive contact with conductive ground plane member 50. The earlike end tabs of the laminar conductors and of the insulating disk fit into the slots in the holder as shown.

The effect of the assembled arrangement of parts in FIG. 4 is to place a pair of varistors as varistor means 20 at each location in parallel electrically, thus enhancing energy-handling capability of small varistors. The ground plane conductor in contact with a varistor of each pair also acts as a heat sink to restrain their temperature rise so as to keep them from overheating under heavy surge loads.

Figure 5:
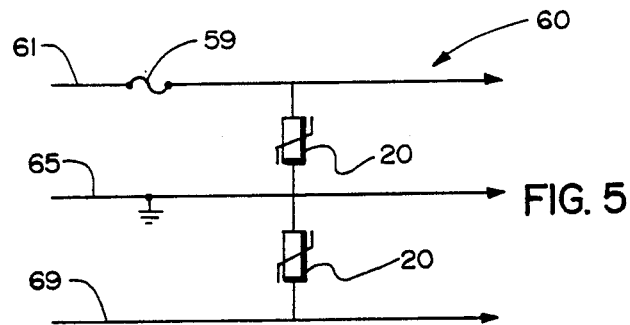
FIG. 5 is a schematic electrical diagram of single-phase power lines with surge-protection such as by the foregoing apparatus.

FIG. 5 shows schematically power-line arrangement 60 with varistor means 20 installed between power line 61 and neutral line 65, which is grounded, and with another varistor means 20 between power line 69 and the neutral line. Arrows indicate the downstream direction to electrical equipment (not shown) powered by such a single-phase arrangement. According to this invention each such varistor means preferably includes two or more varistors interconnected in parallel circuit. Such varistor means are exemplified in the embodiment of the preceding views, showing a pair of varistors in each location. Alternatively twice as many varistors may be assembled analogously, as shown in subsequent views. Either an intermediate number of varistors or a larger number thereof may be used with like effect according to this invention.

Figure 6:
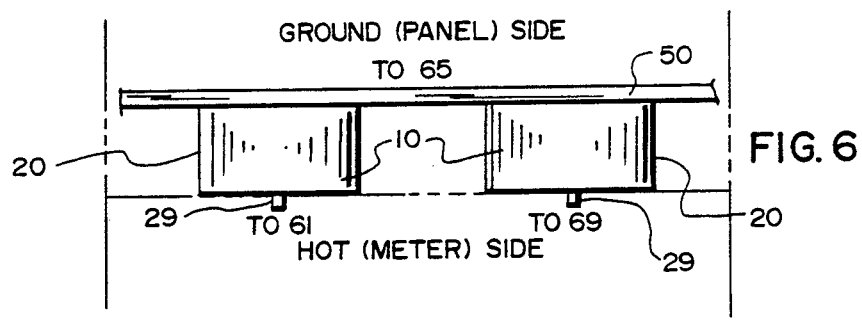
FIG. 6 is a side elevation of an assembly of the apparatus of FIG. 4 including holders with varistors and laminar members therein.

FIG. 6 shows pair of varistor means 20 including holder devices 10 with varistors inside oriented as in FIG. 4, with ground plane 50 in contact with the (not shown) topmost varistor-contacting laminar part in each. Slotting of the holder sidewall is omitted here for simplicity of the showing. The slots may be limited to recessing of the holder's inside wall, insulating the tabs from the exterior. The ground plane is connected to neutral line 19, as noted, on the GROUND (PANEL) SIDE of the apparatus, while conductors 29 (one protruding from each holder device) go to power lines 61 and 69, respectively, as noted on the HOT (METER) SIDE thereof. The broken vertical lines (at the sides of the view) indicate lateral bounding of the apparatus by a suitable housing, whether meter's, panel's, or an intermediate adapter's, or an equivalent enclosure. Fuse 62 is present in power line 61, as is conventional.

Operation of the apparatus of this invention will be readily understood. In the event of an electrical transient that exceeds the usual power voltage sufficiently to pose an equipment hazard, i.e., a "surge", it appears across the power lines and is imposed the varistors. In a very short time, varistor conduction occurs and bleeds the surge harmlessly off to ground via intervening conductive elements. It will be understood that a path is provided to the grounding rod or cable via cooperating conductors (not shown) with which contact is made upon assembling the apparatus, whether in the meter base or between the meter and an electrical utility panel or box—which conventionally has a socket into which the meter plugs, at least in the absence of plug-and-jack adapter means therebetween.

Perhaps not so apparent is the fact that the current flow in a lightning-induced surge, even for only a few microseconds to a millisecond or so, may result in a current density of hundreds, thousands, or even tens of thousands of amperes per square centimeter. Despite the low resistance of the path through the varistors to ground, the resulting heat to be dissipated often is quite appreciable. To limit increase in "watts loss" via the varistors, which conduct even more readily at increased temperature, the ground plane conductor functions as a heat sink, as well as a current conductor. The heat sink also tends to reduce the possibility of flashover, shorting, or other damage to the varistors. The heat-sinking action enables the varistors to withstand repeated lightning surges or similar intermittent disturbances without heat damage to the varistors or other parts—and without electrical damage to any meter protected thereby, and/or to downstream electrical equipment. Surge-generated heat is subsequently conveyed away—usually mostly by conduction, partly by convection, and less by radiation—to the environment. Many such surges can be accommodated while increasing the temperature of such varistors and heat sink relatively little.

The varistors themselves, which comprise chiefly sintered metal oxides or similar compositions, such as zinc oxide or silicon carbide, together with lesser amounts of auxiliary materials, are quite rugged and can stand a good deal of mechanical and electrical abuse. They are articles of commerce and obtainable in a wide range of voltage and current capacities through electrical equipment dealers or manufacturers, such as under the brand or trade name "Panasonic."

The other components of the apparatus of this invention are also readily available in trade channels. The holder devices, as well as appropriate housing and cover members may be adapted from standard articles or may be redesigned specifically for this purpose. They are composed of common non-conductive plastic materials, with or without reinforcing additives. Glass-fiber reinforced polyester and ABS are examples of suitable compositions available.

Figure 7A:
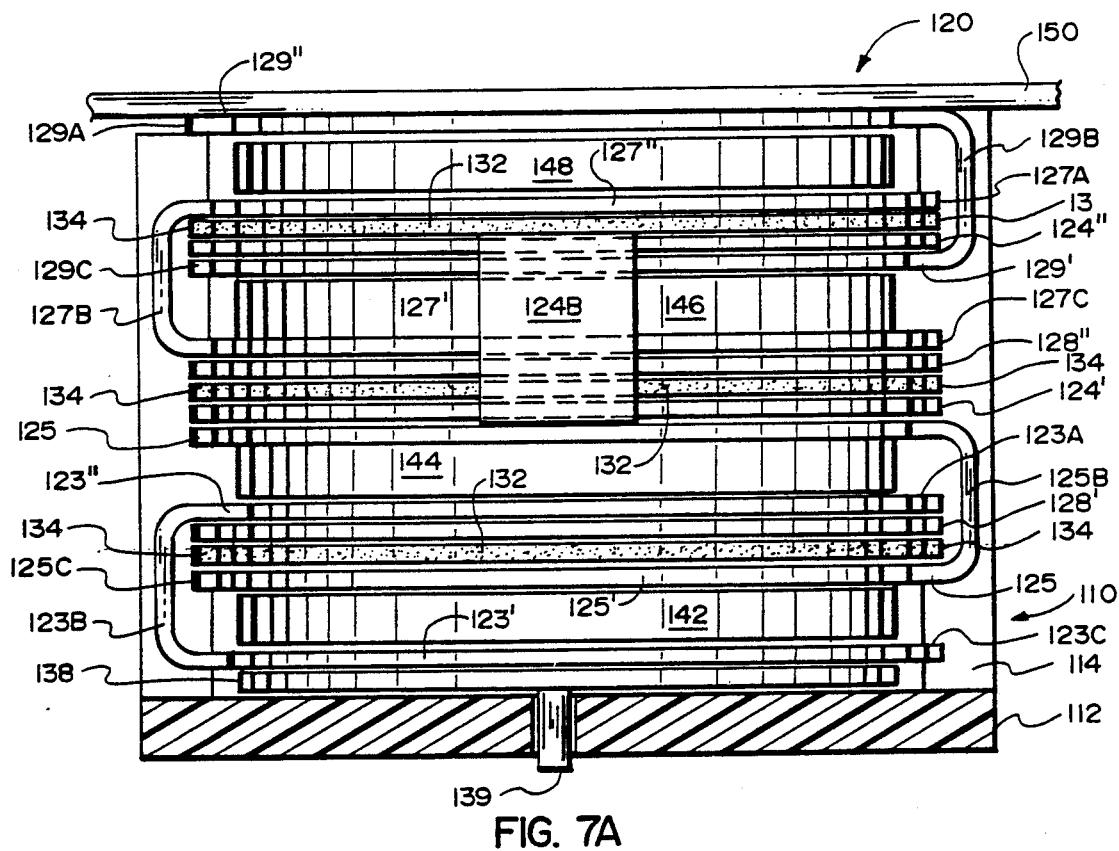
FIG. 7A is a side sectional elevation of parallel interconnection of two pairs of varistors assembled as an extension of the previous single pair assembly.
Figure 7B:
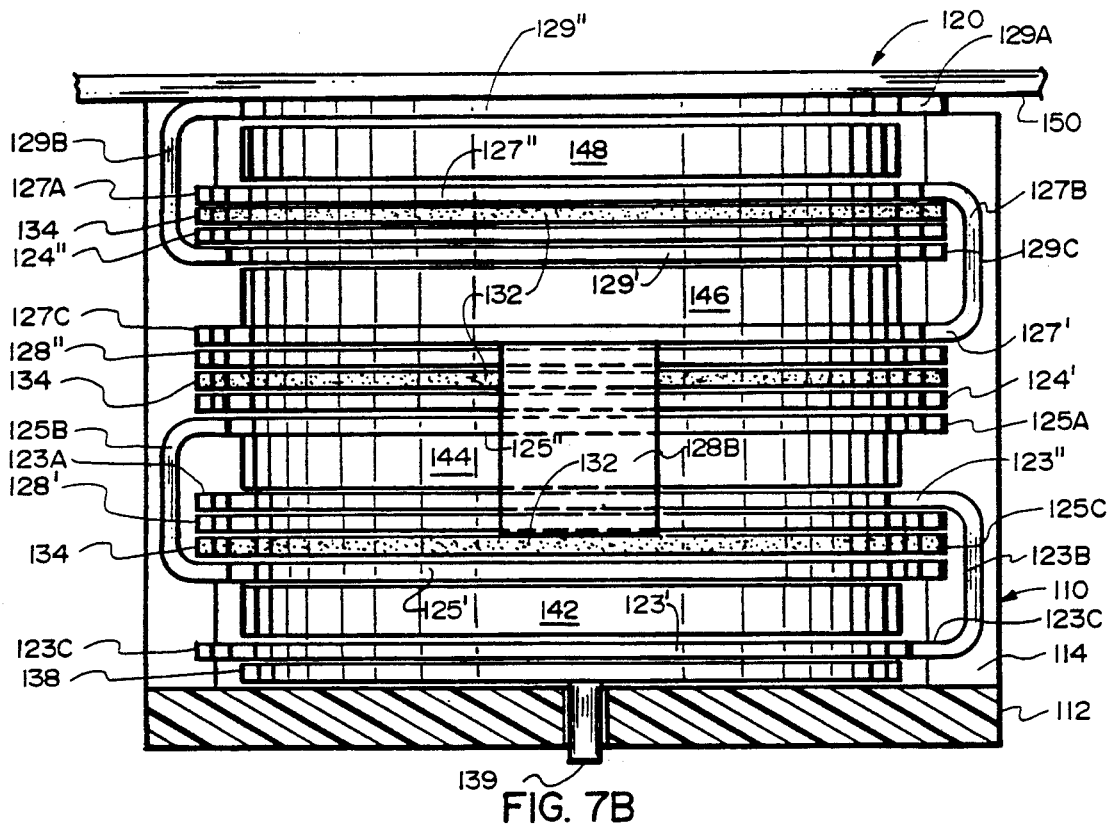
FIG. 7B is a view similar to FIG. 7A except taken from an off-axial vantage point after a quadrant of viewpoint rotation.

FIGS. 7A and 7B show (in a manner like that of FIG. 4) modified varistor means 120, in which components like—or analogous to—those of FIG. 4 are marked by reference numerals larger by 100 or by added primes or alphabetical suffixes. Such identification simplifies (or renders unnecessary) mention of the various components, especially to the extent they correspond to prior components. Added components are assigned numbers in the 100 series ending in two digits not used in reference to the previous embodiment. These views differ from FIG. 4, as single holder device 110 parallels twice as many varistors, again substantially doubling the varistor means current-carrying capacity. FIGS. 7A and 7B are viewed from a quarter turn about the vertical axis relative to FIG. 4 but in opposite directions so that FIG. 7B shows the opposite side from that of FIG. 7A.

FIG. 7A shows two pairs of varistors 142, 144 and 146, 148, in a single stack, each pair being interleaved similarly to varistors 42 and 44 in FIG. 4. Thus, first pair (142, 144) are interleaved by hot side laminar member 123 (overlying conductive bottom disk 132) and ground side laminar member 125, spaced apart by a lowermost insulating disk with body 132 and flanking tabs 134. Added pair of varistors 146 and 148 are provided with hot-side laminar member 127, ground-side laminar member 129, and a like uppermost insulating disk separating them. Added ground-side laminar member 124, whose bight 124B faces the viewer, interconnects from upper face 125" of the second laminar member in contact with the upper face second varistor 144 just below the lower insulating disk to lower face 129" of the fourth laminar member in contact with the upper face of second varistor 144 just below the upper insulating disk. An added intermediate insulating disk with body 132 and tabs 134 intervenes between hot face 125" and ground face 127' (with adjacent added laminar members, immediately above and below the intermediate insulating disk) at the junction of the two pairs.

FIG. 7B mainly resembles a mirror image of FIG. 7A, being viewed from the opposite side, but added hot-side laminar member 128 (whose bight 128B faces the viewer) interconnects from lower face 125' of laminar member 125 in contact with lower face 127', in contact with the lower face of the second varistor just above the lowermost insulating disk to lower face 127' of the third laminar member in contact with the lower face of the third varistor just above the intermediate insulating disk.

Figure 8:
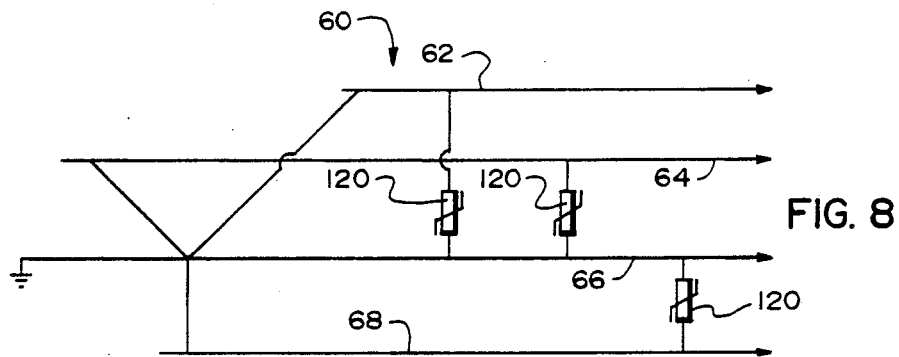
FIG. 8 is a schematic diagram of three-phase power lines with each phase surge-protected in manner analogous to the single-phase arrangement of FIG. 5.

FIG. 8 shows schematically three-phase (wye) power line arrangement 160 with varistor means 120 installed between power line 62 and neutral line 66 which is grounded. Another varistor means 120 is installed between power line 64 and the neutral line, and another varistor 1 means 20 between power line 64 and the neutral line. As in FIG. 5, the downstream equipment location is indicated by arrows, but fuses are omitted from this view.

Figure 9:
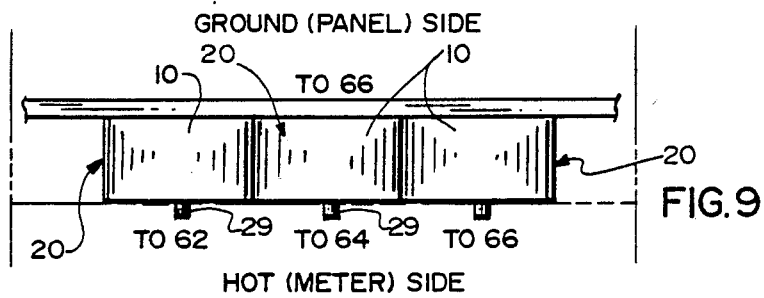
FIG. 9 is a side elevation of holder devices with varistors and laminar members therein for a three-phase power arrangement, otherwise similar to the single-phase view of FIG. 6.

FIG. 9 shows three-phase arrangement 160 of FIG. 8 in a more physical representation, similar to the single-phase arrangement in FIG. 6. The ground plane is connected to neutral line 66, as noted, on the GROUND (PANEL) SIDE of the apparatus, while conductors 29 (one protruding from each holder device) to power lines 62, 64, and 68, respectively, on the HOT (METER) SIDE thereof. Again the broken vertical lines (at the side) indicate lateral bounding of the apparatus by a suitable housing, as of a meter, a panel, or an intermediate adapter, or an equivalent enclosure.

Advantages of using the surge-protective apparatus of this invention have been mentioned above, and others will be readily apparent. A watt-hour meter already in use can be protected simply by unplugging it, plugging the described apparatus in its place, and then plugging the meter into its socket or an intervening adapter.

Although the foregoing description and accompanying diagrams featured specific embodiments, modifications or variants have been suggested. Other variations may be made in the apparatus and/or the method described, as by adding, combining, deleting, or subdividing parts or steps, while retaining some of the advantages and benefits of the invention, which itself is defined in the following claims.

I claim:

1. Assembly of surge-protective apparatus in insulated holding means for varistors of given diameter and thickness protecting against lightning or other source of transient electrical surges, comprising a plurality of varistor means, each including a plurality of varistors interconnected in parallel circuit by conductive laminar members interleaved adjacent respective varistor faces, each such varistor having a hot face and a ground face, each such laminar member including a pair of conductive laminae interconnected by a flexible conductive bight curved to juxtapose the laminae spaced apart in contact with corresponding faces of a pair of varistors in such varistor means, one such laminar member connecting the hot faces of such varistors and another such laminar member connecting the ground faces of such varistors.

2. Assembly of surge-protective apparatus according to claim 1, including an insulating disk interposed between adjacent hot and ground faces of respective varistors.

3. Assembly of surge-protective apparatus according to claim 2, wherein the laminae have earlike tabs extending from the edges thereof opposite the bights joining respective pairs of laminae, and the insulating holding means is recessed to accommodate such tabs.

4. Assembly of surge-protective apparatus according to claim 3, wherein the insulating disk has earlike tabs extending from it at circumferential intervals therealong accommodated in such recesses.

5. Assembly of surge-protective apparatus according to claim 4, wherein the insulated holding means has a cylindrical sidewall slotted to accommodate such bights and such tabs, and the axial extent of the assembly is greater than that of the sidewall.

6. Electrical surge-protective apparatus, comprising a plurality of varistor means respectively connectable between respective power lines and ground, at a location between a hot or utility meter side and a ground or utility panel side, and ahead of downstream electrical equipment, comprising a varistor-holding device, a plurality of like varistors in the holding device, a plurality of conductive laminar members interleaving the varistors and connecting them in parallel circuit, and a hot lead to such a power line, and a conductive ground plane member in contact with the ground side of each of the varistor means.

7. Apparatus according to claim 6, wherein the varistor-holding means is cuplike.

8. Apparatus according to claim 6, wherein the power lines are in a single-phase arrangement, and including such a varistor means between each phase power line and ground.

9. Apparatus according to claim 6, wherein the power lines are in a three-phase wye arrangement, and including such a varistor means between each phase power line and ground.

10. Apparatus according to claim 6, wherein each varistor means includes more than two varistors stacked face-to-face along an axis.

11. Apparatus comprising varistors stacked face-to-face, adapted to provide surge-protection between a power line and ground, each varistor being disklike with hot and ground faces, comprising
a first varistor and a second varistor connected in parallel as a first pair, and a third varistor and a fourth varistor connected in parallel as a second pair,
pair of conductive interleaving members, one such member interconnecting the hot faces of the first pair, and the other such member interconnecting the ground faces of the first pair, and
a second pair of conductive interleaving members, one such member interconnecting the hot faces of the second par, and the other such member interconnecting the ground faces of the second pair, and
a third pair of conductive interleaving members, one such member interconnecting the hot faces of a varistor in the first pair and a varistor in the second pair, and the other such member interconnecting the ground faces of a varistor in the first pair and a varistor in the second pair.

12. Apparatus according to claim 11, including insulating disks between adjacent hot and ground faces of adjacent varistors.

13. Apparatus according to claim 11, wherein each interleaving member has a laminae at each end and an interconnecting flexible bight enabling the laminae to be interposed parallel to one another in the stack of varistors.

14. Apparatus according to claim 13, wherein the bights of the respective interleaving members of each pair are spaced circumferentially from one another about the axis of the stacked varistors.

15. Apparatus according to claim 13, installed between the hot or utility meter side and the ground or utility panel side at a location between power lines and downstream electrical equipment.

* * * * *